United States Patent [19]

Rieger et al.

[11] 4,064,149

[45] Dec. 20, 1977

[54] PROCESS FOR THE MANUFACTURE OF WAXES FOR CARBON PAPER

[75] Inventors: Klaus Rieger; Karl-Heinz Stetter; Josef Wildgruber, all of Gerstohofen, Germany

[73] Assignee: Hoechst Aktiengesellschaft, Frankfurt am Main, Germany

[21] Appl. No.: 674,574

[22] Filed: Apr. 7, 1976

[30] Foreign Application Priority Data

Oct. 18, 1975 Germany .............................. 2546791

[51] Int. Cl.$^2$ .................... C09F 7/02; C11C 3/00
[52] U.S. Cl. .................................. 260/406; 260/423; 260/28 R; 106/31; 106/270; 106/285
[58] Field of Search .................. 260/406, 423, 428, 28, 260/99; 106/31, 32, 270, 285

[56] References Cited

U.S. PATENT DOCUMENTS

| | | | |
|---|---|---|---|
| 1,834,865 | 12/1931 | Pungs et al. | 260/406 X |
| 2,095,338 | 10/1937 | Luther et al. | 260/406 X |
| 2,426,248 | 8/1947 | Sugarman | 260/406 X |
| 2,783,259 | 2/1957 | Hessler | 260/423 |
| 2,806,827 | 9/1957 | Wilder | 106/31 X |
| 3,060,046 | 10/1962 | Kaupp et al. | 106/270 |
| 3,564,032 | 2/1971 | Zinnert et al. | 260/406 X |
| 3,941,608 | 3/1976 | Ehrhardt et al. | 106/31 X |

*Primary Examiner*—Winston A. Douglas
*Assistant Examiner*—John F. Niebling
*Attorney, Agent, or Firm*—Connolly and Hutz

[57] ABSTRACT

For coating carbon paper waxes are required which are not only capable to disperse high amounts of carbon black but also have good oil binding properties. For this purpose natural waxes carrying ester groups are treated with oxygen until they have a high carbon black absorption. The waxes are oxidized in the melt. They can also be oxidized in admixture with hydrocarbon waxes or the derivatives thereof.

12 Claims, No Drawings

PROCESS FOR THE MANUFACTURE OF WAXES FOR CARBON PAPER

This invention relates to a process for the manufacture of waxes for carbon paper from natural waxes having the character of an ester wax.

In the manufacture of carbon papers waxes are required for preparing the coating composition. The waxes serve to disperse large amounts of carbon black in the pigmented coating material without the phenomenon of an undesired thixotropy occuring in the further processing. Moreover, the waxes must bind the oils contained in the pigmented coating material in a manner such that the oils do not exude from the finished papers after coating even after a long storage time and at high ambiant temperatures.

In general, waxes have an insufficient property to disperse carbon black and to bind oil. A wax having both properties to a satisfactory extent is practically unknown. It is the carnauba wax which complies best with the demands made on a carbon paper wax as it has an excellent oil binding capacity, though in many cases its property to disperse carbon black is not sufficient. Carnauba wax has the drawback that it is available in largely varying quantities and qualities and that its price is relatively high. Other waxes, which are much cheaper, for example crude montan wax, bark wax or candellila wax, neither have a satisfactory oil binding capacity nor a sufficient carbon black absorption. Therefore, many attempts have been made to modify the properties of the aforesaid waxes in a manner such that they better comply with the demands made on a wax suitable for making carbon paper.

To modify the said waxes, inter alia oxidation reactions have been proposed. In a process to improve the dispersion of carbon black in crude montan wax the wax is oxidatively bleached with chromosulfuric acid and then the oxidation product is optionally esterified and/or saponified to a small extent (cf. German Patent 1,157,209). The absorption of carbon black by crude montan wax can be further improved by a treatment with oxidants free from chromosulfuric acid, such as permanganate, nitric acid, or sodium chlorite, which are used in the form of aqueous solutions at a temperature in the range of from 100° to 120° C (cf. German Pat. No. 1,110,413 and German Offenlegungsschrift 1,470,449). These processes yield products which exhibit an insufficiently improved carbon black absorption only and no improvement of the oil binding property. The processes have the disadvantages that expensive oxidants must be used which have to be removed again from the wax by complicate purification processes.

So far, oxidations of natural waxes with oxygen-containing gases to improve their properties for making carbon paper waxes have exclusively been described for a special refined sugar cane wax which must be soluble in boiling isopropanol to an extent of at least 97% (cf. U.S. Pat. No. 2,703,807). In this process the molten wax is treated with air until the acid number has risen to a value of from 20 to 35 and the saponification number to a value of from 45 to 75. The light and almost odorless wax oxidate obtained in this manner has gelforming properties, but its properties for making carbon paper waxes are rather poor. To improve the suitability of sugar cane wax for making carbon paper the wax has been reacted with other substances, prior to or after the treatment with the oxidizing gases (cf. U.S. Pat. Nos. 2,683,092; 2,682,516; 2,806,827), but inspite of the considerable economical expenditure a wax having a satisfactory quality for making carbon paper was not obtained.

Attempts have been made oxidatively to bleach other natural waxes, for example crude montan wax, by treating them with air or oxygen under the usual air oxidation conditions, i.e. at about 130° C, but in this manner the acid number was not increased and, therefore, it was assumed that no reaction had taken place. A noticeable alteration of the used wax could only be observed at considerably higher reaction temperatures and pressures, for example at 30 atmospheres gauge, but this alteration was nothing else than an undesired oxidative degradation of the wax resulting in the loss of important wax properties such as hardness and scentlessness (cf. W. Schneider, Brennstoffchemie, volume 6, page 84 (1920)). Hence, it was thought that a usual air oxidation of waxes such as crude montan wax under more severe conditions would not result in an improvement but rather a deterioration of the wax quality. To overcome this problem, it has been proposed to improve the quality of crude montan wax by treating it in the form of a solution with oxygen-containing gases at a temperature of from 70° to 100° C (cf. U.S. Pat. No. 2,783,259). For the same reason it has been recommended to carry out the oxidative bleaching of pulverized crude montan wax at 10° to 90° C with oxygen-containing gases in the presence of nitric oxides (cf. German Offenlegungsschrift 1,620,761). The two processes require much economical expenditure and yield a product unsuitable for making waxes of carbon paper.

It has now been found that waxes having excellent properties for making carbon paper can be obtained by treating molten natural waxes having the character of an ester wax under definite conditions with oxygen-containing gases on the understanding that after the treatment the waxes have an acid number which does not exceed the acid number of the starting wax.

The present invention therefore provides a process for the manufacture of a wax suitable for making carbon paper by treating a molten natural wax having the character of an ester wax with oxygen-containing gases, which comprises treating the wax, at a temperature of from its melting point to 250° C, while intensely mixing with oxygen, air or another oxygen-containing gas in an amount of from 0.01 to 10 m$^3$ per hour and kilogram of wax, at all times an excess of oxygen being present, until the absorption of carbon black of a taken sample amounts to 80 to 140% by weight.

It is surprising and could not have been foreseen that the aim of the inventon, that is to say the manufacture of a wax suitable for making carbon paper from natural waxes can be achieved in simple manner since the present knowledge and the teaching of U.S. Pat. No. 2,783,259 and German Offenlegungsschrift 1,620,761 indicate that the properties of the waxes cannot be improved at all or that they are deteriorated and the teaching in the U.S. Patent cited in conection with the manufacture of waxes for carbon paper from highly refined sugar cane wax suggests that the properties of waxes suitable for making carbon paper can only be improved by increasing the acid number and this combined with further reactions. On no account it could have been expected that the waxes obtained by the process of the invention would show such an excellent dispersion capacity for carbon black and high oil binding property, which are by far superior to the properties of known waxes suitable for making carbon paper, while other important wax properties such as hardness, odor and emulsification are maintained or even improved. As compared with known processes, in the process of the invention cheap natural waxes, which are generally used in the crude state, are treated by very simple methods and the desired properties are obtained without additional further reactions although such reactions are, of course, possible.

Natural waxes having ester wax character, which are oxidized in the molten state or, optionally, in the form of a melt dispersed in water (cf. German Pat. No. 2,035,706) are waxes of vegetal or animal origin and the acid number of which is not increased under the conditions of the process of the invention. There are mentioned by way of example crude montan wax, peat wax, bark wax, and candelilla wax, carnauba wax, ouricury wax, esparto wax, sugar cane wax, rice wax, maize wax, or beeswax. The process of the invention is especially interesting with crude montan wax and bark wax. The waxes can be used in deresinified or non deresinified form, optionally with the addition of further resin. Bark waxes are waxes obtained by the extraction of bark from trees with solvents, for example as described in U.S. Pat. Nos. 2,562,607; 2,662,893; 2,697,717; 3,789,058 and 3,234,202. In the process of the invention the natural waxes can be used in the form of mixtures with one another or optionally in admixture with hydrocarbon waxes and the refined products and oxidates thereof and the derivatives of said products, such as esterification or saponification products. Hydrocarbon waxes are meant to include natural or synthetic paraffin waxes, microwaxes and polyolefins. Suitable polyolefins are, inter alia, $\alpha$-olefins having 16 to 70 carbon atoms in the molecule and obtained by polymerizing ethylene in the presence of aluminum-organic compounds. When natural waxes are blended with one another any possible mixing ratio can be chosen and in this manner it is often possible to combine the favorable properties of the individual components. When synthetic waxes are added, their amount is generally limited to a proportion of at most 100 and preferably 50% by weight, calculated on the amount of natural waxes with ester wax character, that is to say the mixture to be oxidized according to the invention shall contain at most 50 or 25% by weight of hydrocarbon waxes, as otherwise the favorable properties for making carbon paper and originating from the natural waxes do not sufficiently prevail.

Prior to the treatment according to the invention, the natural waxes or their mixtures or the added components may have been subjected to another preliminary treatment, for example a treatment with a solvent, with absorption agents, a heat treatment, an oxidative bleaching, a partial or complete esterification, saponification or amidation. However, to obtain products having good properties such a pre-treatment is generally unnecessary.

Air is preferably used as oxidizing gas, although airoxygen mixtures or pure oxyen or gases liberating oxygen may also be used. The amount of gas required are in the range of from 0.01 to 10.0, preferably 0.1 to 1.0 m³ per hour and kilogram of wax. To carry out successfully the process of the invention two features are particularly important, namely during the entire course of the reaction oxygen must be present in excess, i.e. the off-gases must contain at any time free oxygen, and care must be taken that the wax and oxidizing gas are very intensely mixed.

By the gas current a small amount, depending on the nature of the wax used, of volatile and condensable substances are removed from the reaction mixture and this removal may contribute to the improvement in the wax quality. The quality improvement is, however, not the result of the blowing out alone. This is clearly proven by the fact that a noticeable improvement in the wax quality cannot be obtained by blowing through nitrogen or hydrogen instead of oxygen-containing gases. The effect is not based either on a mere heating (cf. German Pat. No. 1,110,413), as the quality improvement of the invention cannot nearly be reached by a heat treatment alone. Apart from this, the waxes of the invention differ from the heat treated waxes, the waxes treated with oxygen-free gases and from the starting waxes by characteristic differences in their hardness, color, odor, iodine number, hydroxyl number, carbonyl number, and molecular weight.

The waxes or wax mixtures are treated at a temperature in the range of from their melting point to 250° C, preferably from 100° to 200° C and more perferably from 120° to 180° C. The most favorable reaction temperature at which optimum product quality as regards carbon black absorption and oil binding capacity can be obtained in the shortest possible period of time depends on the nature of the starting wax. The optimum reaction temperature for crude montan wax and candelilla wax is generally about 160° C and for bark wax it is generally about 140° C. Lower reaction temperatures necessitate longer reaction periods, while higher reaction temperatures result in unsatisfactory product qualities, especially with regard to the oil binding capacity. The poorer product quality obtained at higher reaction temperatures is the result of an oxidative degradation of the waxes which manifest itself by an increase in the acid number.

The reaction period necessary to obtain optimum product properties depends to a certain extent on the type of the natural wax used. In general, it is in the range of from 0.5 to 20 and preferably 1 to 10 hours. To shorten the reaction period, the reaction can also be performed under elevated pressure or in the presence of catalysts. A catalytic effect can be obtained, for example, by adding metal compounds such as cobalt or manganese salts, free radical forming compounds such as peroxides, oxidized wax, ozone, or high energy radiation. In practice, the reaction period is determined by continuously taking samples from the reaction mixture and measuring the carbon black absorption. The reaction is dicontinued as soon as the wax absorbs from 80 to 140% by weight of carbon black. In general, the absorption should be above 90 and preferably above 100% by weight.

As compared to untreated waxes, the waxes obtained by the process of the invention generally have a higher molecular weight, a higher oxygen content (carbonyl number and peroxide number), a higher density, a higher saponification number, a higher carbonyl number, a higher drop point, a darker color, a lower iodine number, a lower hydroxyl number and less odor. The acid number is not increased but in most cases reduced. This latter fact is especially important to the quality of the product. The infrared spectrum shows a more pronounced ester band and a weaker acid band.

The quality of the final product depends on the type of the starting product. An especially pronounced improvement is obtained with waxes which alone have hardly properties for making carbon paper, for example crude montan wax, bark wax, or condelilla wax. Hence, the process of the invention permits to transform such cheap waxes in simple manner into valuable waxes for making carbon paper. Moreover, other waxes which already have properties suitable for making carbon paper, for example carnauba wax, can be further improved in their properties.

Besides the carbon black absorption and the oil binding capacity, other properties of the treated waxes are different from the properties of the starting waxes. In general, soft waxes, for example bark wax, become distinctly harder, while hard waxes such as crude montan wax or carnauba wax keep their high hardness. Further important utilitarian properties, for example the emulsifiability of bark wax, are further improved.

The waxes obtained by the process of the invention are used, in the first place, for the manufacture of carbon paper. The coating compositions obtained therewith are easy to process and exhibit a high writing strength, they have a long service life and good storing properties. They can be used not only for coating the copying side of the carbon paper but also for back side coating, carbon papers of this type being characterized by an especially low tendency to rolling up. The products are also well suitable for use in copying papers or tapes and quite generally for the manufacture of masterbatches. Owing to their other improved properties, such a higher hardness and better emulsifiability, the waxes can also be used for other applications, for example in the fields of polishes, corrosion protection, hydrophobization, metal processing and plastics processing.

The waxes obtained by the process of the invention, which generally can be used directly for making coating compositions for carbon paper, can be further modified and optionally improved by subsequent treatments, for example with solvents or absorbents, by a heat treatment, oxidative bleaching, partial or complete esterification, saponification, or amidation reactions, by addition reactions, for example with maleic anhydride, or by mixing with other substances.

The following examples illustrate the invention. The absorption of carbon black was determined according to the following method: 31 parts by weight of wax, 17 parts by weight of plate paraffin 52°/54° C, 33 parts by weight of spindle oil, 2 parts by weight of methyl violet base solubilized in olein (1:1) and 2 parts by weight of victoria blue base solubilized in olein (1:1) were melted together and then carbon black was added until the pigment composition did no longer flow. The amount of carbon black absorbed to the flow limit, expressed in percent and calculated on the wax proportion of the pigment composition is called carbon black absorption.

As a measure for the oil binding capacity there is used the temperature at which oil exudes on slowly heating in an air bath from a cylindrical test specimen consisting of wax and spindle oil (2:3) and standing on filter paper (oil binding temperature). The higher the temperature, the better the oil binding capacity.

EXAMPLE 1

In a vessel with stirrer having a capacity of 30 liters and made from stainless steel 10 kg of non deresinified crude montan wax were melted and then vigorously stirred for 6 hours at 160° C while passing through 5 m³ air per hour. As compared with the starting wax, the wax obtained had the following characteristics:

|  | starting wax | final product |
|---|---|---|
| carbon black absorption (%) | 58 | 106 |
| oil binding temperature (° C) | less than 30 | 40 |
| flow hardness (kg/cm²) | 760 | 780 |
| density (g/cm³) | 1.010 | 1.019 |
| acid number | 32 | 27 |
| saponification number | 94 | 118 |
| carbonyl number | 13 | 18 |
| iodine number | 28 | 21 |
| hydroxyl number | 36 | 25 |
| drop point (° C) | 85 | 87 |
| molecular weight | 797 | 1 037 |

EXAMPLE 2

In the vessel as used in Example 1, 10 kg of deresinified crude montan wax were stirred for 4 hours at 170° C while passing through 3 m³ of air per hour. The wax obtained had a carbon black absorption of 107% and an oil binding temperature of 40° C as compared to a carbon black absorption of 74% and an oil binding temperature of less than 30° C of the starting wax.

EXAMPLE 3

In the vessel as used in Example 1, 10 kg of bark wax, obtained by solvent extraction of the bark of douglas pine (Pseudotsuga taxifolia), were treated with air for 6 hours at a temperature of 140° C. The wax obtained had the following characteristics, compared with the starting wax:

|  | starting wax | final product |
|---|---|---|
| carbon black absorption (%) | 48 | 103 |
| oil binding temperature (° C) | 30 | 40 |
| penetration number | 10 | 2 |
| flow hardness (kg/cm²) | 240–260 | 680–700 |
| density (g/cm³) | 1.041 | 1.062 |
| acid number | 68 | 65 |
| saponification number | 145 | 147 |
| carbonyl number | 37 | 45 |
| iodine number | 73 | 50 |
| hydroxyl number | 120 | 91 |
| drop point (° C) | 59 | 60 |
| color | dark brown | black |
| molecular weight | 547 | 775 |
| peroxide number | 16 | 20 |

Moreover, the final product had better emulsifying properties than the starting product.

EXAMPLE 4

Under the conditions of Example 1, 10 kg of commercial carnauba wax were treated with air for 6 hours. As compared to the starting wax, the wax obtained had the following characteristics:

|  | starting wax | final product |
|---|---|---|
| carbon black absorption (%) | 48 | 91 |
| oil binding temperature (° C) | 35 | 45 |
| flow hardness (kg/cm²) | 570 | 580 |
| acid number | 21 | 15 |
| saponification number | 70 | 93 |
| carbonyl number | 13 | 14 |
| iodine number | 31 | 30 |
| hydroxyl number | 27 | 15 |
| drop point (° C) | 69 | 73 |

EXAMPLE 5

10 kg of commercial carnauba wax of the grade "fatty grey" were treated with air for 6 hours under the conditions of Example 1 but at a temperature of 140° C. The wax obtained had a carbon black absorption of 113% and an oil binding temperature of 55° C as compared to a carbon black absorption of 68% and an oil binding temperature of 50° C of the untreated wax.

EXAMPLE 6

Under the conditions of Example 1, 10 kg of a mixture of 2 parts by weight of carnauba wax "fatty grey" and 1 part by weight of bark wax were treated for 6 hours with air but at a temperature of 150° C. The wax obtained had a carbon black absorption of 103% and an oil binding temperature of 50° C as compared to a carbon black absorption of 65% and an oil binding temperature of 40° C of the starting mixture.

EXAMPLE 7

1 kg of the wax obtained according to Example 3 from bark wax was esterified by stirring at 120° C with 30 g of ethylene glycol in the presence of catalytic amounts of phosphoric acid. The wax obtained had a carbon black absorption of 104% and an oil binding temperature of 45° C.

EXAMPLE 8

1 kg of the wax obtained according to Example 4 was saponified at 120° C by stirring the molten wax with 10 g of calcium hydroxide. The wax obtained had a carbon black absorption of 95% and an oil binding temperature of 50° C.

EXAMPLE 9

In a pressure resistant vessel with intensive stirrer 5 kg of bark wax as used in Example 3 and 20 l of water were treated for 5 hours with 3 m³ air per hour under a pressure of 15 atmospheres gage and at a temperature of 150° C. The wax obtained had a carbon black absorption of 105% and an oil binding temperature of 45° C.

What is claimed is:

1. A process for the manufacture of a carbon paper wax having a carbon black absorption in the range of from 80 to 140% by weight and an oil binding temperature of at least 30° C. by treating a molten natural wax having ester wax character with an oxygen-containing gas, which comprises treating the molten wax at a temperature in the range of from its melting point to 250° C with oxygen, air, or another oxygen-containing gas in an amount of from 0.01 to 10 m³ per hour and per kilogram of wax, throughout the treatment maintaining the oxygen in excess and intensely mixing same with the wax, continuing the treatment until a carbon paper wax is obtained having a carbon black absorption within said range, thereby producing a wax having an acid number which does not exceed the acid number of the starting wax.

2. The wax product of claim 1.

3. The process of claim 1, wherein prior to the oxygen treatment the natural wax is subjected to a treatment with a solvent.

4. The process of claim 1, wherein prior to the oxygen treatment the natural wax is subjected to a treatment with an absorbent.

5. The process of claim 1, wherein prior to the oxygen treatment the natural wax is subjected to a heat treatment.

6. The process of claim 1, wherein prior to the oxygen treatment the natural wax is subjected to an oxidative bleaching.

7. The process of claim 1, wherein prior to the oxygen treatment the natural wax is subjected to esterification.

8. The process of claim 1, wherein prior to the oxygen treatment the natural wax is subjected to saponification or amidation.

9. The process of claim 1, wherein crude montan wax, peat wax, bark wax, candelilla wax, carnauba wax, ouricury wax, esparto wax, rice wax, sugar cane wax, maize wax, or beeswax in deresinified or non deresinified form is used as natural wax having ester wax character.

10. The process of claim 1, wherein a mixture of natural waxes having ester wax character is used.

11. The process of claim 1, wherein a mixture of a natural wax having ester wax character and a hydrocarbon wax or a modification product thereof containing at most 50% by weight of hydrocarbon wax or the modification product thereof is used.

12. The process of claim 1, wherein the treatment with air or another oxygen-containing gas is performed in the presence of a catalyst.

* * * * *